United States Patent
Liu et al.

(10) Patent No.: US 8,892,690 B2
(45) Date of Patent: Nov. 18, 2014

(54) SYSTEM AND METHOD FOR MANAGING ACCOUNT OF INSTANT MESSENGER

(75) Inventors: Zhao Liu, Guangdong (CN); Fan Wang, Guangdong (CN); Xiaobo Shao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 577 days.

(21) Appl. No.: 12/194,292

(22) Filed: Aug. 19, 2008

(65) Prior Publication Data

US 2009/0006544 A1 Jan. 1, 2009

Related U.S. Application Data

(63) Continuation of application No. PCT/CN2007/000754, filed on Mar. 8, 2007.

(30) Foreign Application Priority Data

Mar. 10, 2006 (CN) .......................... 2006 1 0034329

(51) Int. Cl.
G06F 15/173 (2006.01)
H04L 29/06 (2006.01)
H04L 12/58 (2006.01)

(52) U.S. Cl.
CPC ............ *H04L 63/105* (2013.01); *H04L 12/581* (2013.01); *H04L 51/04* (2013.01)
USPC ........................................................ 709/219

(58) Field of Classification Search
None
See application file for complete search history.

(56) References Cited

U.S. PATENT DOCUMENTS

| 5,935,248 | A | 8/1999 | Kuroda et al. | |
|---|---|---|---|---|
| 2003/0129574 | A1* | 7/2003 | Ferriol et al. | 434/362 |
| 2003/0154406 | A1* | 8/2003 | Honarvar et al. | 713/201 |
| 2003/0191947 | A1* | 10/2003 | Stubblefield et al. | 713/183 |
| 2003/0196108 | A1 | 10/2003 | Kung | |
| 2004/0143750 | A1* | 7/2004 | Kulack et al. | 713/200 |
| 2004/0189441 | A1* | 9/2004 | Stergiou | 340/5.51 |

(Continued)

FOREIGN PATENT DOCUMENTS

| CN | 1180872 A | 5/1998 |
|---|---|---|
| CN | 1599313 A | 3/2005 |
| CN | 1601960 A | 3/2005 |
| CN | 1719767 A | 1/2006 |

OTHER PUBLICATIONS

International Search Report for International Application No. PCT/CN2007/000754, dated Jun. 28, 2007, and English translation thereof.

(Continued)

*Primary Examiner* — Scott Christensen

(74) *Attorney, Agent, or Firm* — Harness, Dickey & Pierce, P.L.C.

(57) ABSTRACT

A system for managing an Instant Messenger account including a process server and a database server, and the process server is adapted to receive enhanced association information of at least one account from at least one client terminal, transmit the enhanced association information to the database server; when receiving a service request from one client terminal, acquire the enhanced association information of an account corresponding to the client terminal from the database server, generate verification information according to the security level of the service request and transmit the verification information to the client terminal to verify the identity of the user using the client terminal; and the database server is adapted to save the enhanced association information of the at least one account.

19 Claims, 2 Drawing Sheets

(56) References Cited

U.S. PATENT DOCUMENTS

2006/0156385 A1* 7/2006 Chiviendacz et al. ............ 726/2
2006/0161435 A1* 7/2006 Atef et al. .................... 704/246
2006/0287963 A1* 12/2006 Steeves et al. ................. 705/64

OTHER PUBLICATIONS

Chinese Office Action for Chinese Patent Application No. 2006100343295, dated Mar. 27, 2009.
Russian Office Action for Russian Patent Application No. 2008136311, dated Dec. 3, 2009, and English translation thereof.
Vietnamese Office Action for Vietnamese Patent Application No. 1-2010-02453, dated Jun. 30, 2010, and English translation thereof.
Indian First Examination Report for Indian Patent Application No. 4325/CHENP/2008, dated Feb. 28, 2013.
Malaysian Substantive Examination Adverse Report for Malaysian Patent Application No. PI 20083509, dated Jun. 29, 2012.

* cited by examiner

SYSTEM AND METHOD FOR MANAGING ACCOUNT OF INSTANT MESSENGER

CROSS-REFERENCE TO RELATED APPLICATIONS

This application is a continuation of International Application No. PCT/CN2007/000754, filed Mar. 8, 2007. This application claims the benefit and priority of Chinese Application No. 200610034329.5 filed Mar. 10, 2006. The entire disclosures of each of the above applications is incorporated herein by reference.

FIELD

The present disclosure relates to instant messenger technologies, more particularly to a system and method for managing account of Instant messenger.

BACKGROUND

This section provides background information related to the present disclosure which is not necessarily prior art.

As a tool for communication, recreation and information acquisition, Instant messenger (IM) has now been accepted by more and more netizens and are becoming a regular part of their life. IM tools are not only used in recreation but also in work of numerous users.

Along with the rapid growth of IM user groups, security problems of IM tools are also growing and attracting more and more attention of the public. Security breaches caused by viruses spread through IM tools or theft of accounts become common occurrence. When an account is stolen, the IM service of the account owner is affected and, more seriously, the account owner may also lose virtual properties and face personal information leak.

The conventional IM tools usually provide services such as "password protection system" or "password appeal system" for users to get back stolen or lost accounts. When a user register an account, the user selects a password reminder question for a password and configures an answer corresponding to the password reminder question, so that the user may recover the password by answering the password reminder question correctly when the user forgets the password.

However, "password protection information" is configured by few users and can be easily forgotten; moreover, the password reminder question and the corresponding answer are transmitted as unencrypted text and can be easily intercepted by Trojan horses programs. Additionally, the user is usually allowed to configure only one question and one answer, the number and difficulty level of the password reminder questions can not be determined according to different security levels, thus sometimes it is very hard to recover a stolen or lost account.

The defects of the "password appeal system", such as low confirmation ratio, require users to prepare too many evidences, and the success rate of the "password appeals" is low.

In conventional technologies, the association between an account and the owner of the account is weak and a password may be used for multiple services, Therefore, account stealers can easily steal and dispose of an account, or even cause greater loss of the owner of the account.

SUMMARY

This section provides a general summary of the disclosure, and is not a comprehensive disclosure of its full scope or all of its features.

The embodiments of the present invention provide a system and method for managing account of IM, so that the above disadvantages of the conventional technologies are overcome.

The solutions provided by the embodiments of the present invention are explained as follows.

A system for managing account of Instant Messenger includes a process server and a database server, and the process server is adapted to receive enhanced association information of at least one account from at least one client terminal, transmit the enhanced association information to the database server; when receiving a service request from one client terminal, acquire the enhanced association information of an account corresponding to the client terminal from the database server, generate verification information according to the security level of the service request and transmit the verification information to the client terminal to verify the identity of the user using the client terminal; and the database server is adapted to save the enhanced association information of the at least one account.

A method for managing account of Instant Messenger includes:

register, by a client terminal, enhanced association information of an account to a process server; and transmitting, by the process server, the enhanced association information to a database server;

receiving, by the process server, a service request from the client terminal;

acquiring, by the process server, enhanced association information of an account corresponding to the client terminal from the database server, and generating verification information according to the security level of the service request;

transmitting, by the process server, the verification information to the client terminal and receiving a verification answer from the client terminal; and determining, by the process server, whether to accept the service request from the client terminal according to the verification answer.

By applying the system and method for managing account of IM provided by the embodiments of the present invention, the following effects are achieved. In the embodiments of the present invention, enhanced association information is configured for each IM account, verification information is randomly generated by a process server in a verification process and the verification information is associated with the security level of a service request. In this way, it is much more difficult for account stealers to modify the password or sensitive information of a stolen account. Further, since the verification information corresponding to a question includes the correct answer to the question, it is easier for the owner of the account to answer the question when recovering the password. Moreover, the enhanced association information is transmitted in encrypted form, and the verification information is transmitted as a picture not as unencrypted text. Therefore, the verification information is avoided from being intercepted by Trojan horse programs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
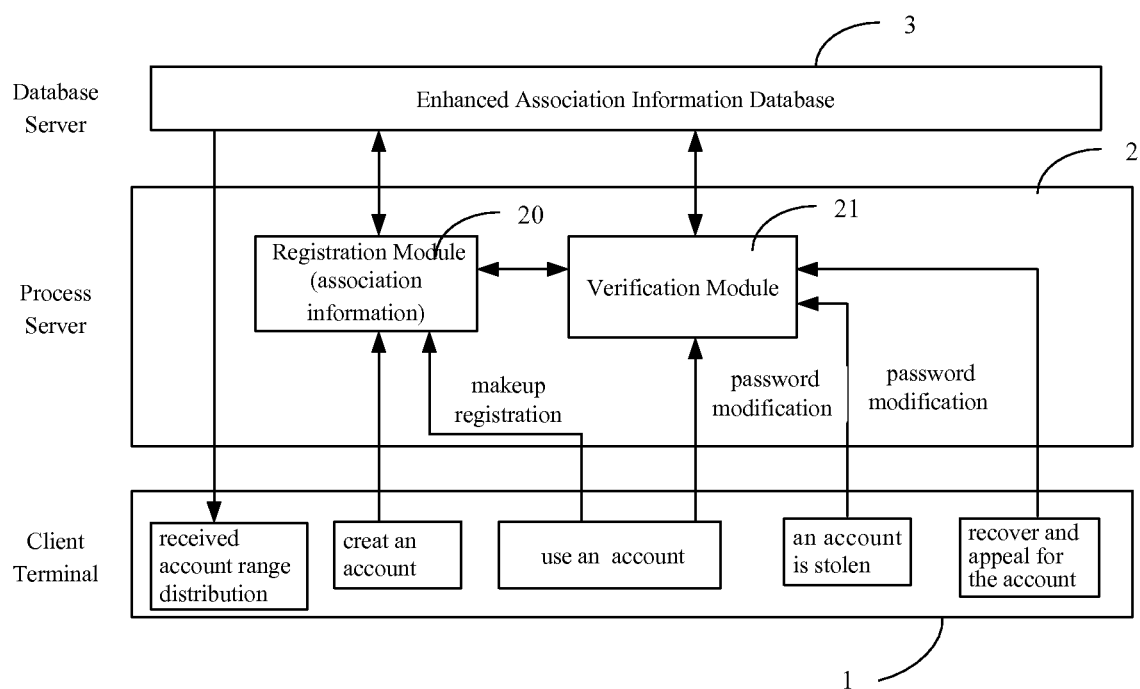
FIG. 1 is a schematic diagram illustrating a system for managing account of IM in accordance with an embodiment of the present invention.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In order to make the object and technical solution of the present invention more apparent, detailed descriptions of the present invention is hereinafter given with reference to the attached drawings and detailed embodiments.

The embodiments of the present invention provide a system and method for managing account of IM. An account of an IM is associated with information closely related to the owner of the account, so that when the password or other sensitive information of the account is to be modified, the user of the account is verified.

FIG. 1 is a schematic diagram illustrating a system for managing account of IM in accordance with an embodiment of the present invention. As shown in FIG. 1, the system includes Database Server 3, Process Server 2 and plurality of Client Terminals 1 (only one is shown).

Client Terminal 1 is connected to Process Server 2 via a network and an IM client is installed in Client Terminal 1. A user may use the client of the IM tool to registers an account, implement IM services (e.g., chat, game, etc.), recover an account and appeal for an account etc. Process Server 2 may include Registration Module 20 configured to receive registration. Specifically in the embodiment, Registration Module 20 receives registration corresponding to enhanced association information of an account from Client Terminal 1, and the enhanced association information may include the password corresponding to the account, questions and answers configured by the owner of the account and the security levels corresponding to the questions and answers.

Process Server 2 may further include Verification Module 21. When receiving a service request from Client Terminal 1, Verification Module 21 acquires enhanced association information corresponding to the security level of the service request, generates verification information and sends the verification information to Client Terminal 1 to verify the identity of a user using Client Terminal 1. For example, Verification Module 21 may receive a service request to modify the password of the account, a service request to recover the account or a service request to appeal for the account from the user. When verification answers from Client Terminal 1 are not identical with the enhanced association information, Verification Module 21 increases the security level and verifies the identity of the user using Client Terminal 1 again. When the identity of the user is determined to be valid, the service request from the user is transmitted to Registration Module 20 to modify the password, recover the account or appeal for the account; when the identity of the user is determined to be invalid, the service request is rejected directly.

Database Server 3 includes or is connected to an Enhanced Association Information Database, and Enhanced Association Information Database saves enhanced association information corresponding to each account. In this embodiment, data transmitted between Database Server 3 and Process Server 2 is encrypted, and Database Server 3 may send the account successfully registered by a user to Client Terminal 1 corresponding to the user.

Figure 2:
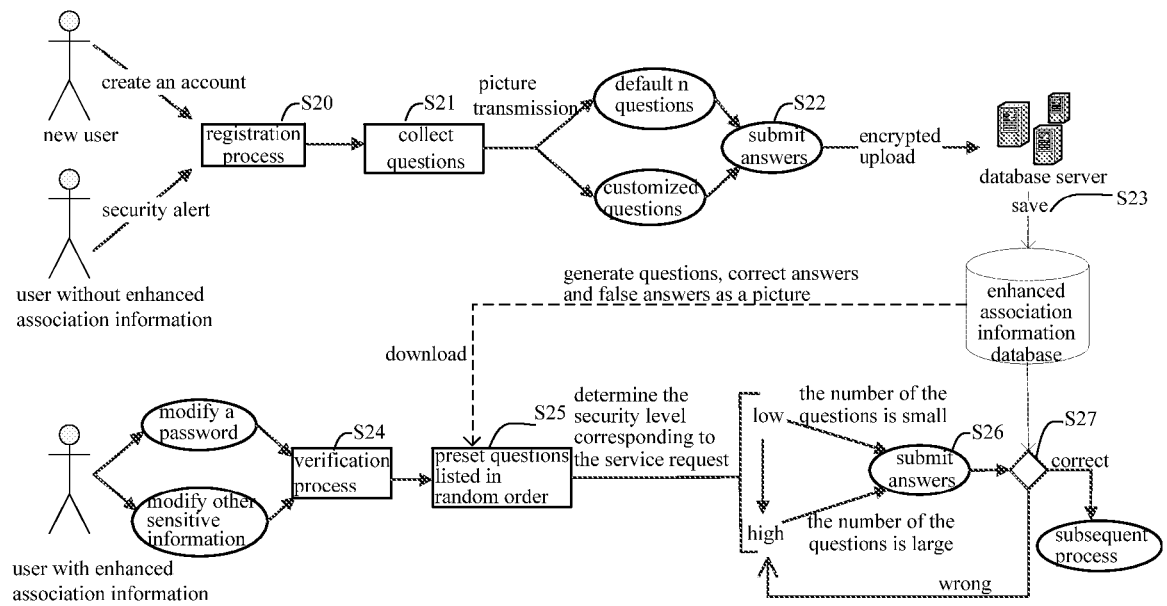
FIG. 2 is a flow diagram illustrating a method for managing account of IM in accordance with an embodiment of the present invention.

FIG. 2 is a flow diagram illustrating a method for managing account of IM in accordance with an embodiment of the present invention, and the method includes a registration process and a verification process.

In the registration process, when a user registers a new account or logs into an account without enhanced association information, Process Server 2 requests the user to configure enhanced association information. When the user registers the new account, Process Server 2 requests the user to configure enhanced association information in the process of registering the account. When the user logs into the account without enhanced association information, Process Server 20 notifies the user, in the form of a security alert, to configure enhanced association information of the account, i.e., makeup registration, and the registration process is performed, i.e. Step S20 is performed.

The enhanced association information includes questions and answers closely related to the owner of the account, e.g., age, height, favorites, birthplace, mother school, etc. In Step S21, when the user enters the registration process of the enhanced association information, Process Server 2 may first collect questions in either of the following two ways. In the first way which may be regarded as the default way, Process Server 2 provides a fixed number of questions, and the questions are acquired in the form of a picture or encrypted data from Database Server 3 so as not to be intercepted by Trojan horses programs easily during the transmission. In the second way, the owner of the account provides the questions according to the practical condition of the owner. When the user thinks that the questions provided by Process Server 2 are hard to answer or remember, the user may configure questions and answers. When the questions and the answers are configured, the user submits the questions and answers in Step S22, Process Server 2 encrypts and transmits the questions and answers to Database Server 3. In Step S23, Database Server 3 saves the enhanced association information.

When a piece of enhanced association information is successfully received by Process Server 2, the enhanced association information is used as the sole foundation of the identity verification when the user operates on sensitive information. In the verification process, Process Server 2 receives a service request, e.g., to modify the password of an account, to pay online, or to operate on other sensitive information related to the account, from Client Terminal 1 (the account corresponding to Client Terminal 1 may be invalid at present), Process Server 2 enters the verification process, i.e. Step S24 to verify the identity of the user using Client Terminal 1 according to the enhanced association information configured in advance by the owner of the account.

Verification Module 21 acquires the enhanced association information of the account, i.e., saved questions and answers, from Database Server 3; the saved questions and answers are transmitted to Verification Module 21 as a picture. Database Server 3 generates a number of false answers to the questions according to the correct answers, and the false answers are very close to the correct answers and are meant to be interfering.

Afterward, in Step S25, Process Server 2 randomly selects a preset number of questions, correct answers and false answers to the questions according to the security level corresponding to the service request from Client Terminal, generates verification information in the form of a picture, and sends the verification information to Client Terminal 1. Since the questions and answers are transmitted as a picture and are display in a random order, it is not easily to intercept the questions and answers by Trojan horses programs. The security level corresponding to the service request from Client Terminal 1 is determined according to the potential threat of loss the service request poses to the owner of the account. For example, when the user requests to modify the password of the account, the system may determine the service request as of highest security level, and Process Server 2 may ask all saved questions to the user. When the user requests an action of a low security level, Process Server 2 may ask only a few questions.

In Step S26, Client Terminal 1 answers the questions in the received verification information and submits verification answers to Process Server 2. In Step S27, Verification Module 21 of Process Server 2 determines whether the verification answers from Client Terminal 1 are correct according to the correct answers from Database Server 3. When the verification answers are correct, the service request from Client Terminal 1 is accepted and forwarded to Registration Module 20 or Database Server 3 according to the type of the service request. For example, when the service request from Client Terminal 1 requests to modify the password, the service request from Client Terminal 1 is forwarded by Verification Module 21 to Registration Module 20, and the process of password modification is started.

When the verification answers from Client Terminal 1 are incorrect, Verification Module 21 increases the security level, randomly selects more questions and answers including false answers, generates new verification information in the form of a picture, and sends the new verification information to Client Terminal 1. The above process is repeated for a preset number of times. When the verification answers from Client Terminal 1 are still incorrect after the preset number of times, Verification Module 21 of Process Server 2 determines the user as invalid user and rejects the service request.

In the embodiments of the present invention, an account of IM is associated with information closely related to the owner of the IM account. When the password or other sensitive information of the account is to be modified, the user of the account is verified. Therefore, the security of the account is ensured and the account is avoided from being used by invalid user.

According to the embodiments of the present invention, the questions and answers including false answers in the enhanced association information are transmitted as a picture. Further, in the verification process, the questions to be answered are randomly selected by the process server, and the questions and available answers are shown at random order. Moreover, the process server determines different security levels according to the service request from the client terminal, and the security levels determine the number and difficulty level of the questions to be answered.

Therefore, since the enhanced association between the account and the owner of the account, it is much more difficult for account stealers to change the password or sensitive information of a stolen account. Further, the verification information corresponding to a question includes the correct answer to the question, it is easier for the owner of the account to answer the question while recovering the password. Moreover, the enhanced association information is transmitted in encrypted form or as a picture, and the verification information is also transmitted as a picture not as unencrypted text. Therefore, the verification information is avoided from being intercepted by Trojan horses programs.

Obviously, the above is only preferred embodiments of the present invention and is not for use in limiting the protection scope of the embodiments of the present invention. Any modification, equivalent substitution, and improvement without departing from the principle of the present invention should be covered in the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system for managing account of Instant Messenger (IM), comprising:
    a process server; and
    a database server;
    wherein a user of an IM client terminal configures enhanced association information including questions and answers to register an account of the user of the IM client terminal, and provides the questions and answers to the process server;
    wherein the process server is adapted to receive the questions and answers from the IM client terminal, and encrypt and transmit the questions and answers to the database server;
    wherein the database server saves the questions and answers and generates false answers to the questions based on the answers provided by the user; and
    wherein, on receiving a service request from the IM client terminal, the process server is adapted to acquire the enhanced association information including the false answers from the database server; select a preset number of questions and answers and the false answers according to a security level of the service request; generate verification information in the form of a single picture according to the security level of the service request, the preset number of questions and answers, and the false answers, wherein the single picture includes the preset number of questions and answers, and the false answers; and transmit the single picture presenting the preset number of questions and answers and the false answers to the IM client terminal to verify the identity of the user using the IM client terminal.

2. The system according to claim 1, wherein the process server comprises a registration module and a verification module; wherein:
    the registration module is adapted to receive the enhanced association information from the IM client terminal and transmit the enhanced association information to the database server; and
    the verification module is adapted to receive the service request from the IM client terminal, acquire the enhanced association information according to the security level of the service request from the database server, generate the verification information, and send the verification information to the IM client terminal.

3. The system according to claim 2, wherein the enhanced association information in the database server comprises a password of the account, the questions and answers configured by the user of the account, and security levels of the questions and answers.

4. The system according to claim 3, wherein the verification module is further adapted to increase the security level and verify the identity of the user using the IM client terminal again when an answer from the IM client terminal is incorrect.

5. A method for managing account of Instant Messenger (IM), comprising:
    configuring and transmitting, by an IM client terminal, enhanced association information of an account to a process server, wherein the enhanced association information includes questions and answers configured by a user of the IM client terminal;
    encrypting and transmitting, by the process server, the enhanced association information to a database server;
    generating, by the database server, false answers to the questions based on the answers provided by the user;
    receiving, by the process server, a service request from the IM client terminal;
    acquiring, by the process server, the enhanced association information including the false answers from the database server;
    selecting, by the process server, a preset number of questions and answers and the false answers according to a security level of the service request;
    generating, by the process server, verification information in the form of a single picture according to the security level of the service request; the preset number of questions and answers, and the false answers, wherein the single picture includes the preset number of questions and answers, and the false answers; and
    transmitting, by the process server, the single picture presenting the preset number of questions and answers and the false answers to the IM client terminal to verify the identify of the user using the IM client terminal.

6. The method according to claim 5, wherein the enhanced association information in the database server comprises a password of the account, the questions and answers configured by the user of the account, and security levels of the questions and answers.

7. The method according to claim 5, further comprising:
    selecting, by the user of the IM client terminal, one of the answers in the single picture displayed at the IM client terminal; and
    determining whether the service request from the IM client terminal is valid according to the answer by:
    determining whether the answer received from the IM client terminal is correct;
    determining that the IM client terminal is a valid user and that the service request is to be accepted when the answer received from the IM client terminal is correct; and
    when the answer is incorrect, increasing the security level, selecting randomly a different number of questions and answers and false answers according to the increased security level, generating new verification information according to the different number of questions and answers and the false answers, transmitting the new verification information in the form of a new single picture to the IM client terminal again, and determining whether to accept the service request from the IM client terminal according to a new received answer.

8. The method according to claim 5, wherein the service request comprises at least a service request to modify a password of the account or a service request to modify sensitive information of the account.

9. The system according to claim 3, wherein, when an answer from the IM client terminal is incorrect, the verification module is further adapted to increase the security level, select a different number of questions and answers and false answers according to the increased security level of the service request to generate new verification information, the number of false answers to each question being larger than the number of false answers to each question before the security level is increased, send the new verification information in the form of a new single picture to the IM client terminal to verify the identity of the user using the IM client terminal again.

10. The method according to claim 7, wherein selecting randomly the preset number of questions and answers and false answers according to the increased security level comprises:
 selecting a larger number of false answers to each question than the number of false answers to each question before the security level is increased when the answer from the IM client terminal is incorrect.

11. The system according to claim 1, wherein the process server is further adapted to receive the single picture transmitted from the IM client terminal, the single picture transmitted from the IM client terminal including an answer selected by the user of the IM client terminal.

12. The system according to claim 1, wherein the user selects one of the answers in the single picture displayed at the IM client terminal, and wherein the single picture including the answer selected by the user is transmitted from the IM client terminal to the process server.

13. The method according to claim 5, further comprising:
 selecting one of the answers in the single picture displayed at the IM client terminal; and
 transmitting the single picture including the selected answer from the IM client terminal to the process server.

14. The system according to claim 1, wherein the process server requests the user of the IM client terminal to configure the enhanced association information, and wherein, in response to receiving the request from the process server, the user of the IM client terminal configures the questions and answers and provides the questions and answers to the process server.

15. A non-transitory computer-readable medium comprising instructions executable by a process server for:
 receiving enhanced association information of an account of a user of an IM client terminal, wherein the enhanced association information includes questions and answers configured by the user of the IM client terminal;
 encrypting and transmitting the enhanced association information to a database server;
 receiving a service request from the IM client terminal;
 acquiring the enhanced association information including false answers to the questions from the database server, wherein the false answers are based on the answers provided by the user;
 selecting a preset number of questions and answers and false answers according to a security level of the service request;
 generating verification information in the form of a single picture according to the security level of the service request, and the preset number of questions and answers and false answers, wherein the single picture includes the preset number of questions and answers and false answers; and
 transmitting the single picture presenting the preset number of questions and answers and false answers to the IM client terminal to verify the identity of the user using the IM client terminal.

16. The non-transitory computer-readable medium according to claim 15 further comprising instructions for:
 receiving, after the user of the IM client terminal selects one of the answers in the single picture displayed at the IM client terminal, the single picture including the selected answer from the IM client terminal.

17. The non-transitory computer-readable medium according to claim 15 further comprising instructions for:
 determining, based on the user selecting one of the answers in the single picture displayed at the IM client terminal, whether the selected answer is correct; and
 accepting the service request if the selected answer is correct.

18. The non-transitory computer-readable medium according to claim 15 further comprising instructions for:
 determining, based on the user selecting one of the answers in the single picture displayed at the IM client terminal, whether the selected answer is correct; and
 if the selected answer is correct:
 increasing the security level;
 selecting a different number of the questions and answers and false answers according to the increased security level;
 generating a new verification information based on the different number of the questions and answers and false answers;
 sending the new verification information in the form of a new single picture to the IM client terminal; and
 determining whether to accept the service request based on whether a new answer to the new verification information received from the IM client terminal is correct.

19. The non-transitory computer-readable medium according to claim 18 further comprising instructions for:
 rejecting the service request if the new answer is incorrect.

* * * * *